(12) United States Patent
Ji et al.

(10) Patent No.: US 12,242,839 B2
(45) Date of Patent: Mar. 4, 2025

(54) UPGRADABLE ELECTRONIC DEVICE, SERVER FOR UPGRDADING ELECTRONIC DEVICE, AND METHOD FOR UPGRADING ELECTRONIC DEVICE

(71) Applicant: LG ELECTRONICS INC., Seoul (KR)

(72) Inventors: Baekgeun Ji, Seoul (KR); Seonghwan Kang, Seoul (KR); Minkyu Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 182 days.

(21) Appl. No.: 17/989,011

(22) Filed: Nov. 17, 2022

(65) Prior Publication Data

US 2023/0153096 A1    May 18, 2023

(30) Foreign Application Priority Data

Nov. 17, 2021    (KR) .......................... 10-2021-0158669

(51) Int. Cl.
   *G06F 8/65*    (2018.01)
(52) U.S. Cl.
   CPC ...................... *G06F 8/65* (2013.01)
(58) Field of Classification Search
   USPC ...................................................... 717/168
   See application file for complete search history.

(56) References Cited

U.S. PATENT DOCUMENTS

| 5,963,970 A | 10/1999 | Davis |
| 2011/0265075 A1 | 10/2011 | Lee |
| 2014/0007075 A1 | 1/2014 | Sporkert et al. |
| 2016/0283220 A1* | 9/2016 | Tverdal ................ H04W 4/50 |
| 2016/0291940 A1* | 10/2016 | Searle .................. H04L 67/303 |
| 2016/0291959 A1* | 10/2016 | Searle .................. H04L 41/082 |
| 2019/0034256 A1* | 1/2019 | Fox ........................ G06F 9/445 |
| 2019/0258469 A1* | 8/2019 | Hayashidera ............. G06F 8/65 |
| 2019/0265965 A1 | 8/2019 | Acharya et al. |

(Continued)

FOREIGN PATENT DOCUMENTS

| JP | 2006155377 | 6/2002 |
| KR | 10-2009-0043988 | 5/2009 |

(Continued)

OTHER PUBLICATIONS

Extended European Search Report dated Mar. 31, 2023 issued in Application No. 22208111.9.

*Primary Examiner* — Qing Chen
*Assistant Examiner* — Clint Thatcher
(74) *Attorney, Agent, or Firm* — KED & ASSOCIATES, LLP

(57) ABSTRACT

Disclosed herein are an upgradable electronic device, a server for upgrading the electronic device, and a method for upgrading the electronic device. The electronic device includes: a storage unit storing program data; a communication unit receiving and storing a file for updating the program data from a management server and transmitting update data for updating the program data based on the stored file; and a controller updating the program data in response to the update data, wherein the update data transmitted from the communication unit includes delta data and an instruction, the delta data including only a changed portion of the program data.

13 Claims, 11 Drawing Sheets

(56) References Cited

U.S. PATENT DOCUMENTS

| | | | |
|---|---|---|---|
| 2020/0057628 A1* | 2/2020 | Sano | B60R 16/0231 |
| 2020/0167307 A1* | 5/2020 | Okada | G06F 9/06 |
| 2021/0349855 A1 | 11/2021 | Kang et al. | |

FOREIGN PATENT DOCUMENTS

| | | |
|---|---|---|
| KR | 10-2011-0118975 | 11/2011 |
| KR | 10-2017-0022062 | 3/2017 |
| KR | 10-2017-0119417 | 10/2017 |
| KR | 10-2088170 | 3/2020 |

\* cited by examiner

UPGRADABLE ELECTRONIC DEVICE, SERVER FOR UPGRDADING ELECTRONIC DEVICE, AND METHOD FOR UPGRADING ELECTRONIC DEVICE

CROSS-REFERENCE TO RELATED APPLICATION(S)

This application claims priority to and the benefit of Korean Patent Application No. 10-2021-0158669, filed in Korea on Nov. 17, 2021, the disclosure of which is incorporated herein by reference in its entirety.

BACKGROUND

1. Field

Embodiments of the present disclosure relate to an upgradable electronic device, a server for upgrading the electronic device, and a method for upgrading the electronic device.

2. Background

An electronic device includes a controller that controls operations of the electronic device. The controller controls the electronic device through execution of a specific program to implement functions desired by users.

In general, after-sales service for electronic devices is limited to simple support, such as debugging of the program. Accordingly, a user who wants a new function needs to purchase a new electronic device. That is, an electronic device purchased by a user undergoes a significant decrease in residual value over time, which leads to user complaints. Accordingly, many studies are being conducted on a method of improving existing functions of an electronic device or adding a new function to the electronic device through modification of the program, and some of such studies are being put into practice.

According to a conventional method, before performing update of the program in an electronic device, the entirety of the program is transmitted from a server to the electronic device, or the program is divided into predetermined units and then a changed portion among the divided units is transmitted from the server to the electronic device. However, as the number of functions performed by an electronic device increases and each of the functions becomes more sophisticated, the size of the program increases. Accordingly, such a conventional method involves increase in amount of data transmitted to upgrade an electronic device, which results in increase in amount of time taken for upgrade.

BRIEF DESCRIPTION OF THE DRAWINGS

Embodiments will be described in detail with reference to the following drawings in which like reference numerals refer to like elements, and wherein.

DETAILED DESCRIPTION

Figure 1:
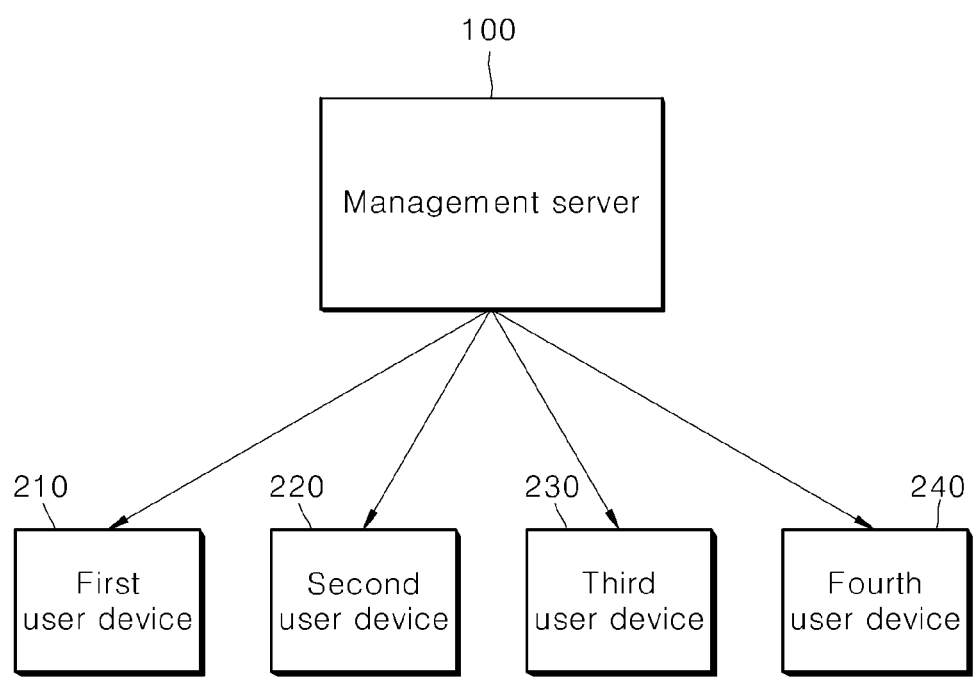
FIG. 1 is a schematic block diagram of a system for upgrading home appliances according to one embodiment of the present disclosure.

The above and other objects, features, and advantages of the present disclosure will become apparent from the detailed description of the following embodiments in conjunction with the accompanying drawings. Description of known functions and constructions which may unnecessarily obscure the subject matter of the present disclosure will be omitted. Like components will be denoted by like reference numerals throughout the specification.

It will be understood that, although the terms "first", "second", and the like may be used herein to describe various elements and the like, these elements should not be limited by these terms. These terms are only used to distinguish one element from another element. Thus, unless stated otherwise, a first element discussed below could be termed a second element, or vice versa, without departing from the scope of the present disclosure.

In addition, when a component is referred to as being "connected to", "coupled to" or "joined to" another component, these components may be connected, coupled, or joined to each other directly or through another component, or intervening component(s) may be "interposed" therebetween.

Throughout the specification, unless stated otherwise, each element may be singular or plural in number. As used herein, the singular forms "a", "an", and "the" are intended to include the plural forms as well, unless the context clearly indicates otherwise. Moreover, the terms "comprises", "comprising", "includes" and/or "including" when used in this specification, should not be construed to mean that a process, method, article, or apparatus comprising a list of elements or steps necessarily comprises all the elements or all the steps. Thus, such a process, method, article, or apparatus may be free from some of the elements or the steps, or may further include one or more other elements or steps.

Throughout the specification, the expression "A and/or B" means A, B, or A and B, unless stated otherwise, and the expression "C to D" means "greater than or equal to C and less than or equal to D", unless stated otherwise.

Hereinafter, an upgradable home appliance, a server for upgrading the home appliance, and a method for upgrading the home appliance according to some embodiments of the present disclosure will be described. FIG. 1 is a schematic block diagram of a system for upgrading home appliances according to one embodiment of the present disclosure. The system according to this embodiment may include a management server (or management computer) 100 and multiple user devices 210, 220, 230, 240.

The management server 100 may store information about electronic devices to be upgraded and information about an electronic device owned by each user. The information about the electronic devices to be upgraded may include at least one selected from among identifiers of the electronic devices, program data for each version of the electronic devices, and delta data derived from comparison between program data for each previous version of the electronic device and program data for a most recent version of the electronic device. The information about the electronic device owned by each user may include a user identifier and an electronic device identifier associated with the user identifier.

The management server 100 may transmit a file including the delta data to update program data for each of the user devices 210, 220, 230, 240. Here, the file transmitted by the management server 100 may further include a set of instructions that need to be executed by each of the user devices 210, 220, 230, 240.

Each of the multiple user devices 210, 220, 230, 240 may include at least one electronic device. Here, the electronic device may refer to a variety of electronic devices, including a variety of home appliances, such as an air conditioner, an air purifier, a refrigerator, a washing machine, a steam closet, and a water purifier, mobile devices, such as a smartphone, and a variety of automotive electronic devices (for example, a device for autonomous driving, a device for controlling vehicle operation, and the like).

In addition, each of the multiple user devices 210, 220, 230, 240 may include at least one user terminal. The at least one electronic device may update program data in response to the file received from the management server 100 (that is, the file including the delta data and/or the set of instructions).

In the following description, home appliances will be used as an example of electronic devices to be upgraded. However, it will be understood that the present disclosure is not limited thereto.

Figure 2:
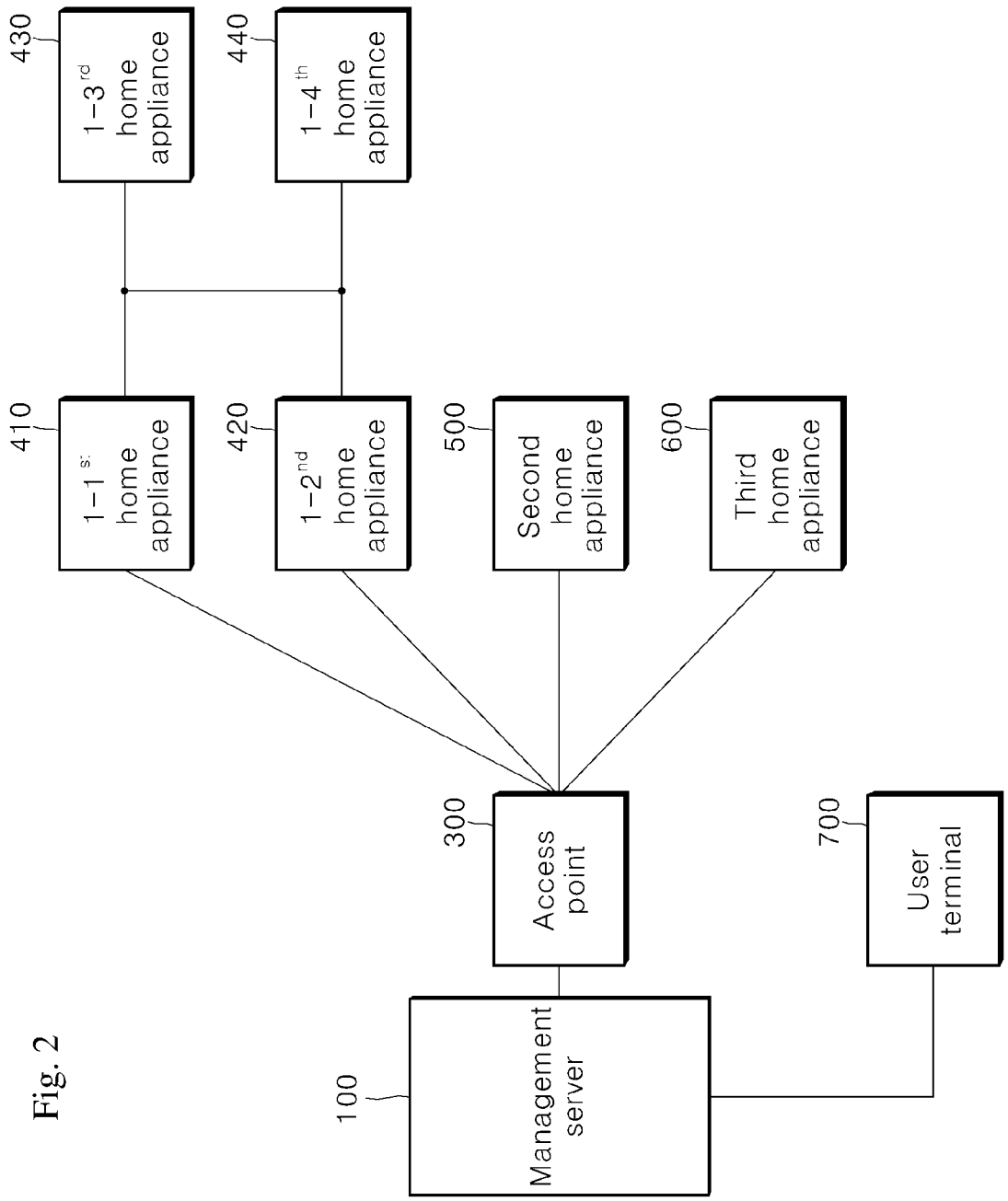
FIG. 2 is a schematic block diagram of a system for upgrading home appliances according to one embodiment of the present disclosure, illustrating a user device of FIG. 1 in more detail.

FIG. 2 is a schematic block diagram of a system for upgrading home appliances according to one embodiment of the present disclosure, illustrating the user device of FIG. 1 in more detail. The system according to this embodiment may include a management server 100, an access point 300, multiple home appliances 410, 420, 430, 440, 500, 600, and a user terminal 700. That is, each of the multiple user devices 210, 220, 230, 240 of FIG. 1 may include at least one selected from among an access point 300, multiple home appliances 410, 420, 430, 440, 500, 600, and a user terminal 700. Functions of the management server 100 may be the same as described in FIG. 1.

The access point 300 may serve to relay communication between the management server 100 and the home appliances 410, 420, 500, 600. The access point 300 may be a Wi-Fi router.

Each of the multiple home appliances 410, 420, 430, 440, 500, 600 may perform its own function through execution of a corresponding program. The home appliances 410, 420, 430, 440 may be home appliances connected to one another to perform a predetermined function. For example, a 1-1st home appliance 410, a 1-2nd home appliance 420, and a 1-3rd home appliance 430 may be indoor units of an air conditioner and a 1-4th home appliance 440 may be an outdoor unit of the air conditioner. In addition, the 1-1st home appliance 410 and the 1-2nd home appliance 420 may include a communication module (for example, a Wi-Fi module). Accordingly, each of the 1-1st home appliance 410, the 1-2nd home appliance 420, and the 1-3rd home appliance 430 may control at least one selected from among the temperature, humidity, and fine dust concentration in a room through execution of a corresponding program.

The second home appliance 500 and the third home appliance 600 may be home appliances operated independently from each other. For example, each of the second home appliance 500 and the third home appliance 600 may be one of various home appliances such as a washing machine, an air purifier, a steam closet, and a refrigerator. Each of the second home appliance 500 and the third home appliance 600 may include a communication module (for example, a Wi-Fi module).

The user terminal 700 may be a mobile terminal of a user who owns the multiple home appliances 410, 420, 430, 440, 500, 600. In some embodiments, the access point 300 may be omitted. In this case, each of the home appliances 410, 420, 500, 600 may access the management server 100 through the Internet or the like.

Figure 3:
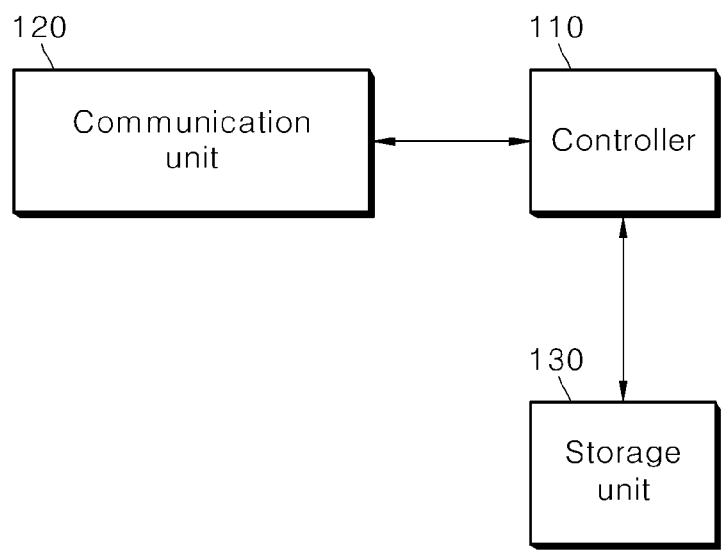
FIG. 3 is a schematic block diagram of a management server for upgrading home appliances according to one embodiment of the present disclosure.

FIG. 3 is a schematic block diagram of a management server for upgrading home appliances according to one embodiment of the present disclosure. The management server 100 may include a controller 110, a communication unit (or communication interface) 120, and a storage unit (also referred to as a storage device or a memory) 130.

The controller 110 may generate "delta data" for each home appliance based on data stored in the storage unit 130 and may transmit the delta data to the home appliances 410, 420, 500, 600 (see FIG. 2) through the communication unit 120. In addition to the delta data, the controller 110 may transmit a set of instructions to be executed by a controller of each of the home appliances 410, 420, 500, 600 (see FIG. 2).

The controller 110 may include at least one processing unit and/or a memory. Here, the processing unit may include, for example, a central processing unit (CPU), a graphics processing unit (GPU), a microprocessor, an application-specific integrated circuit (ASIC), and a field-programmable gate array (FPGA), and may have multiple cores. The memory may be a volatile memory (for example, RAM, and the like), a non-volatile memory (for example, ROM, flash memory, and the like), or a combination thereof.

The communication unit 120 may transmit a signal to an external device under the control of the controller 110. In addition, the communication unit 120 may receive a signal from an external device and may send the received signal to the controller 110. The communication unit 120 may transmit/receive signals in a wired and/or wireless manner. The communication unit 120 may include a modem, a network interface card (NIC), an integrated network interface, a radio frequency transmitter/receiver, an infrared port, a USB connection, or any other interface for communication with other computing devices.

Under the control of the controller 110, the storage unit 130 may store data received through the communication unit 120 and/or data processed by the controller 110. For example, the storage unit 130 may store at least one selected from among a user identifier, a home appliance identifier associated with the user identifier, program data for each version of a home appliance, and delta data derived from comparison between program data for each previous version of the home appliance and program data for a most recent version of the home appliance.

Figure 4:
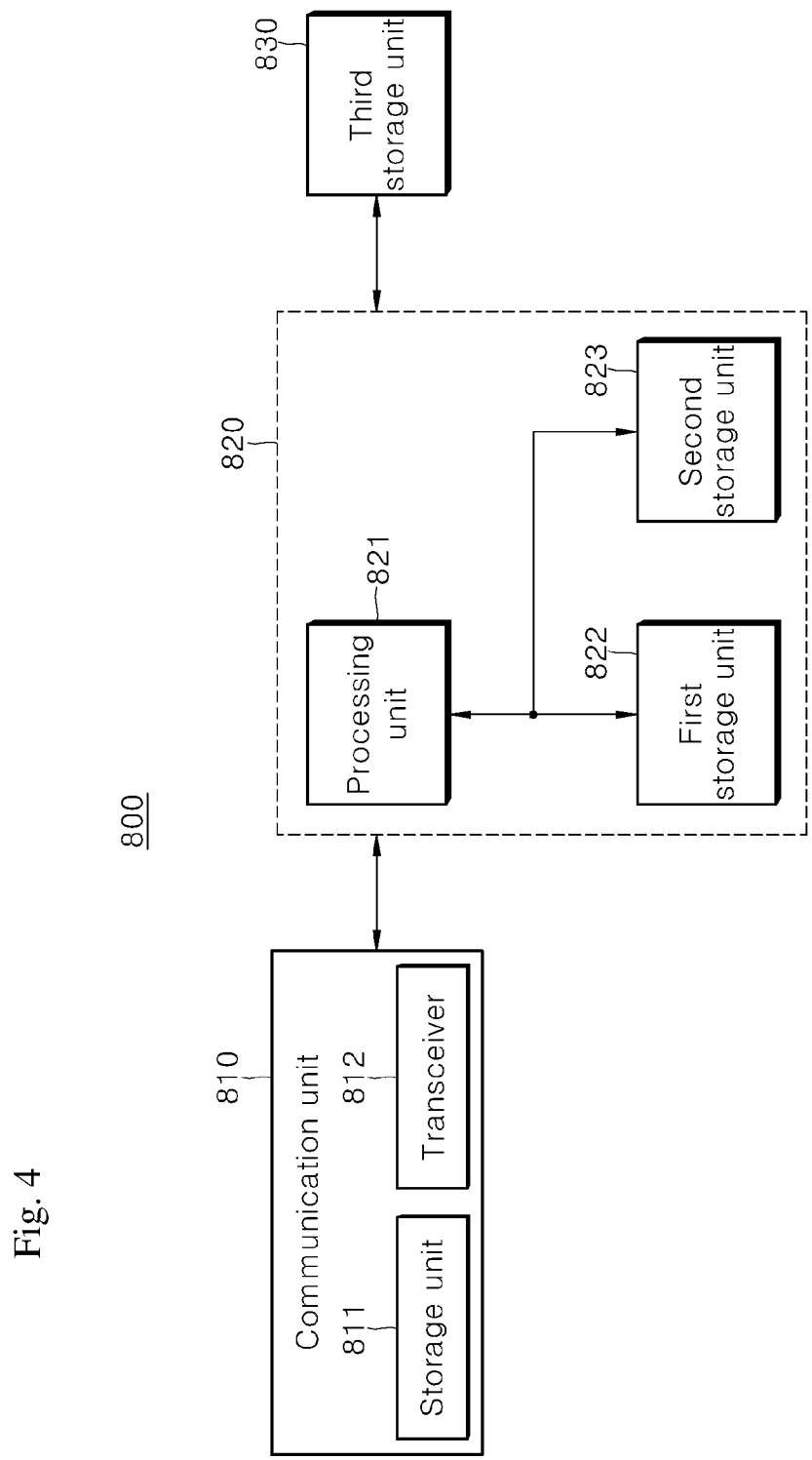
FIG. 4 is a schematic block diagram of an upgradable home appliance according to one embodiment of the present disclosure.

FIG. 4 is a schematic block diagram of an upgradable home appliance 800 according to one embodiment of the present disclosure. The home appliance according to this embodiment may include a communication unit (or appliance communication interface) 810, a controller (or appliance controller) 820, and a third storage unit (or third storage device) 830. The communication unit 810 may include a storage unit (or storage device) 811 and a transceiver 812, and the controller 820 may include a processing unit 821, a first storage unit (or first storage device) 822, and a second storage unit (or second storage device) 823. Each of the home appliances 410, 420, 500, 600 (see FIG. 2) may include the components shown in FIG. 4. In some embodiments, the home appliance according to this embodiment may be free from or exclude some of the first storage unit 822, the second storage unit 823, and/or the third storage unit 830.

The communication unit 810 may receive data from the management server 100 (see FIG. 1 or FIG. 2) and may transmit the received data to the controller 820. The data received from the management server 100 (see FIG. 1 or FIG. 2) may include delta data as described above and an instruction executed by the controller 820. The communication unit 810 may include a radio frequency transmitter/receiver, an infrared port, a USB connection, or any other interface. For example, the communication unit 160 may include a near-field communication module that transmits/receives signals according to a communication protocol such as Wi-Fi or Bluetooth.

The storage unit 811 may store data received from the management server 100 (see FIG. 1 or FIG. 2). The storage unit 811 may be a non-volatile memory. For example, the storage unit 811 may be a flash memory. The transceiver 812 may transmit data stored in the storage unit 811 to the controller 820.

The controller 820 may store a program for implementing functions of the home appliance, and may execute the stored program to cause the home appliance to perform a specific function. In addition, the controller 820 may update the stored program in response to data received from the communication unit 810.

The processing unit 821 may include a central processing unit (CPU), a graphics processing unit (GPU), a microprocessor, an application-specific integrated circuit (ASIC), a field-programmable gate array (FPGA), and the like, and may have multiple cores.

The first storage unit 822 may be a non-volatile memory. For example, the first storage unit 822 may be a flash memory. The first storage unit 822 may store the program.

The second storage unit 823 may be a volatile memory. For example, the second storage unit 823 may be a RAM. A portion of program data stored in the first storage unit 822 may be loaded to the second storage unit 823, and the program data stored in the second storage unit 823 may be written to a specific area of the first storage unit 822.

The third storage unit 830 may be a non-volatile memory. The third storage unit may be one selected from among a flash memory, a magnetic storage, and an optical storage. The program for implementing functions of the home appliance may also be stored in the third storage unit 830.

Figure 5:
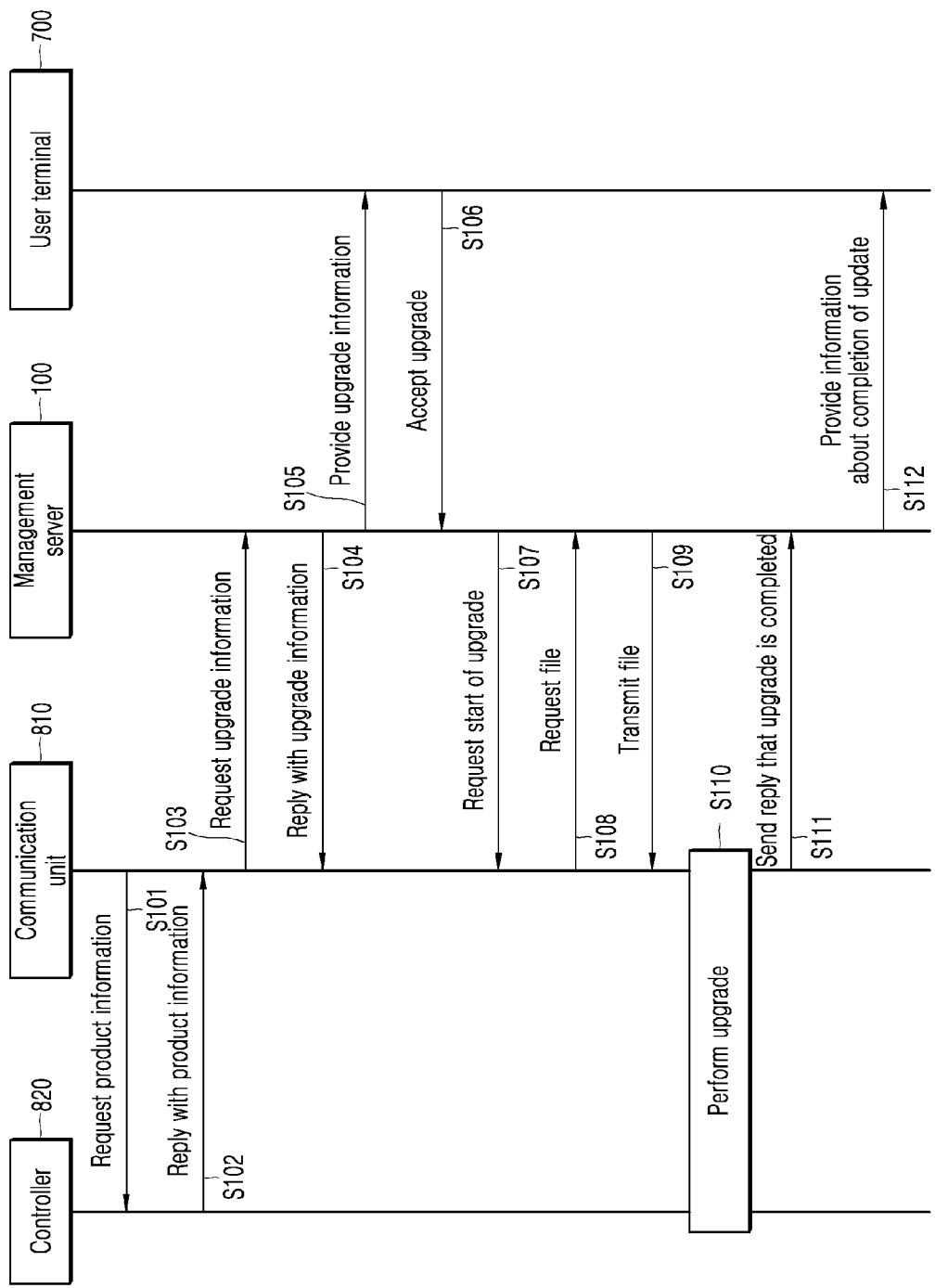
FIG. 5 is a flow diagram illustrating the overall operation of a method for upgrading home appliances according to one embodiment of the present disclosure.

FIG. 5 is a flow diagram illustrating the overall operation of a method for upgrading home appliances according to one embodiment of the present disclosure. First, the communication unit 810 may request a home appliance identifier from the controller 820 (step S101). The home appliance identifier may include at least one of a serial number of the home appliance and model name of the home appliance. Then, the controller 820 may reply to the communication unit 810 with the home appliance identifier in response to the request for product information (step S102).

Then, the communication unit 810 may request information on whether there is an upgrade to be applied to the home appliance from the management server 100 (step S103). Here, the communication unit 810 may transmit the home appliance identifier to the management server 100. In addition, the communication unit 810 may further transmit user information to the management server 100.

Then, the management server 100 may reply to the communication unit 810 with upgrade information, which is information on whether there is an upgrade to be applied to the home appliance (step S104). In addition, the management server 100 may provide the user terminal 700 with the upgrade information (step S105). The management server 100 may retrieve information about a user of the home appliance from the storage unit 130 (see FIG. 3), or may receive user information from the communication unit 810.

Then, when the user accepts upgrade of the home appliance using the user terminal 700, information on upgrade acceptance may be transmitted from the user terminal 700 to the management server 100 (step S106). Alternatively, the user may accept upgrade of the home appliance using an input/output unit of the home appliance, instead of using the user terminal 700.

In response to user acceptance, the management server 100 may request the communication unit 810 to start upgrade of the home appliance (step S107). In response to the upgrade start request from the management server 100, the communication unit 810 may request file transmission from the management server 100 (step S108). In response to the file transmission request from the communication unit 810, the management server 100 may transmit a file including delta data and/or a set of instructions to the communication unit 810 (step S109).

Then, the communication unit 810 and the controller 820 may update the program for the home appliance using the file received from the management server 100 (step S110). When upgrade is completed, the communication unit 810 may send a reply indicating that upgrade is completed to the management server 100 (step S111). In response to the reply from the communication unit 810 indicating that upgrade is completed, the management server 100 may provide the user terminal with information about completion of upgrade (step S112).

Figure 6:
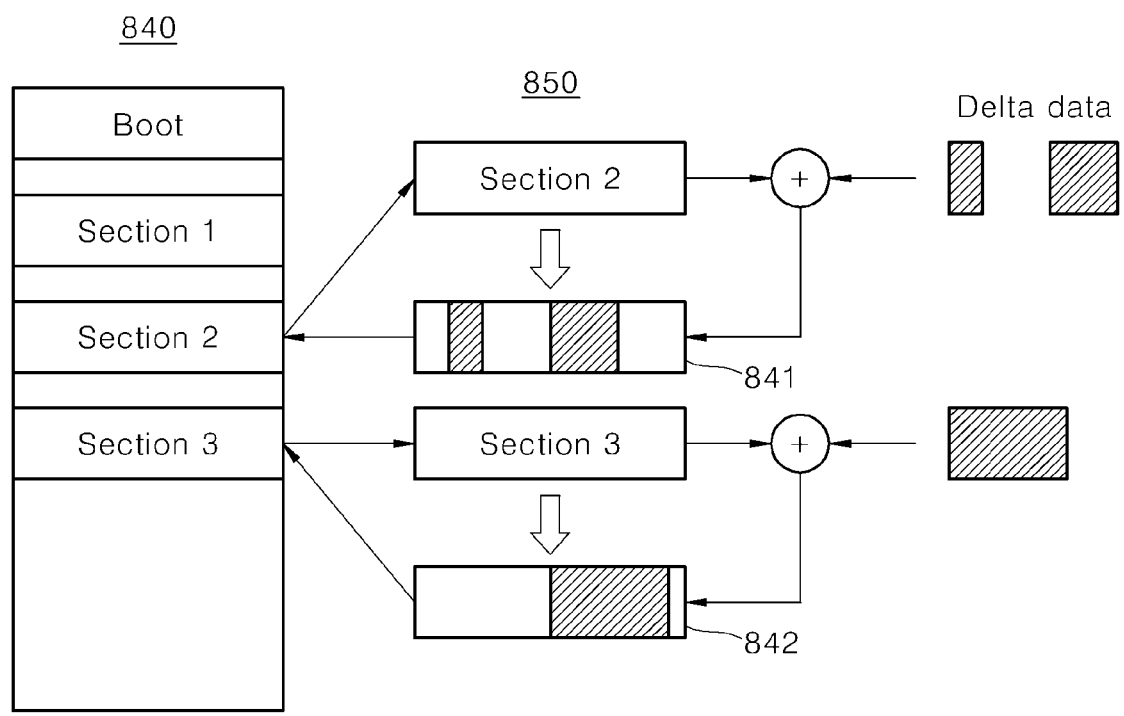
FIG. 6 is a diagram illustrating a process of updating program data in the method for upgrading home appliances according to one embodiment of the present disclosure.

FIG. 6 is a diagram illustrating a process of updating the program data in the method for upgrading home appliances according to one embodiment of the present disclosure. In FIG. 6, reference numeral 840 denotes a non-volatile memory of the home appliance and reference numeral 850 denotes a volatile memory of the home appliance. For example, 840 in FIG. 6 may be the same as the first storage unit 822 (see FIGS. 4) and 850 in FIG. 6 may be the same as the second storage unit 823 (see FIG. 4). In addition, delta data is data transmitted from the management server 100, and may refer to a changed portion of the program data.

According to this embodiment, the management server 100 transmits, to the home appliance, delta data, which is a changed portion of the program data, a location where the delta data is to be written, and an instruction to write the delta data to the predetermined location. In addition, according to this embodiment, the program for implementing the functions of the home appliance may be split into multiple sections for storage. Here, each of the sections may refer to one of multiple areas of the storage unit. Herein, it is assumed that the program is split into three sections for storage and a new program file is a program file in which a portion of data in each of sections 2 and 3 are changed, as shown in FIG. 6.

In the following description, each operation may be performed by the controller 820 (see FIG. 4) of the home appliance (more specifically, the processing unit 821 of the home appliance). First, data stored in section 2 of the non-volatile memory 840 may be read and then written to the volatile memory 850. Then, a portion of the program data written to the volatile memory 850 may be replaced with delta data received from the management server 100. Then, deletion may be performed on section 2 of the non-volatile memory 840 and then the modified program data 841 may be written to section 2 of the non-volatile memory 840.

Similarly, data stored in section 3 of the non-volatile memory 840 may be read and then written to the volatile memory 850. Then, a portion of the program data written to the volatile memory 850 may be replaced with delta data received from the management server 100. Then, deletion may be performed on section 3 of the non-volatile memory 840 and then the modified program data 842 may be written to section 3 of the non-volatile memory 840.

Figure 7:
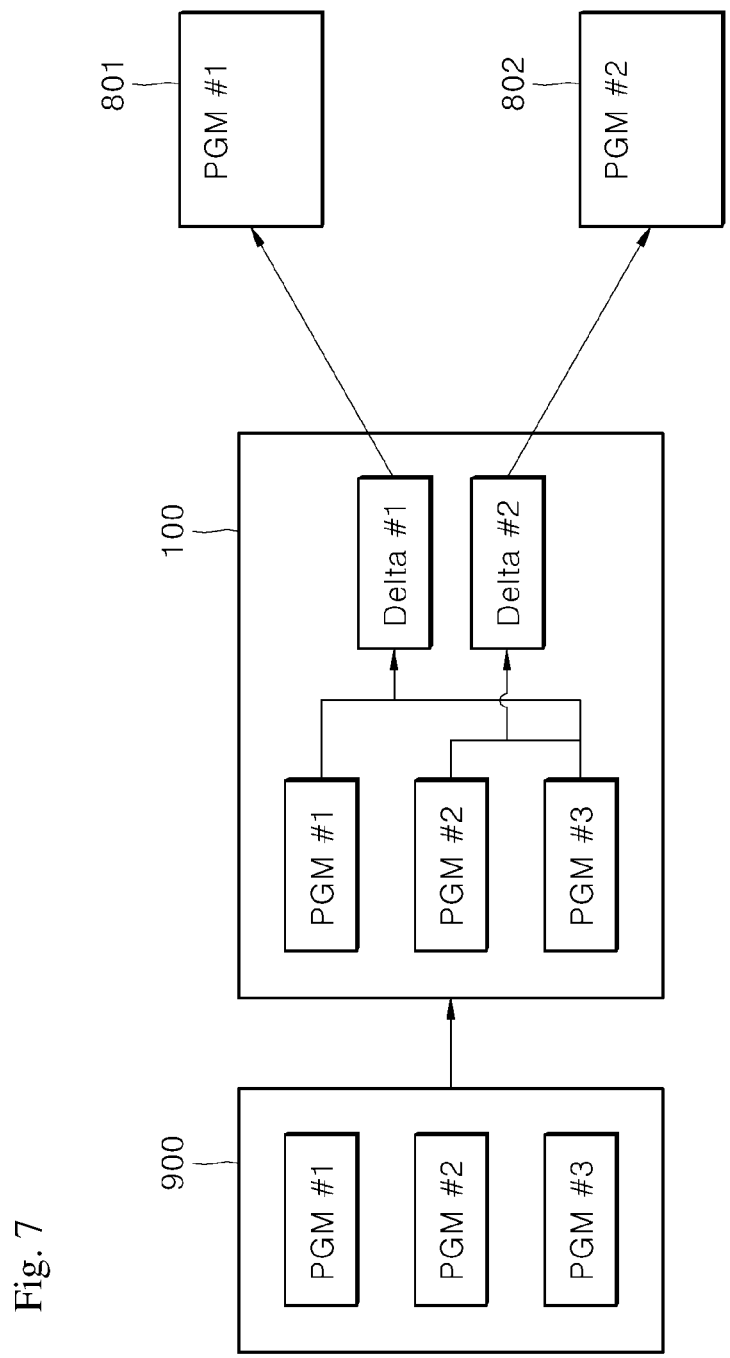
FIG. 7 is a diagram illustrating a process of generating and transmitting delta data in the method for upgrading home appliances according to one embodiment of the present disclosure.

FIG. 7 is a diagram illustrating a process of generating and transmitting delta data in the method for upgrading home appliances according to one embodiment of the present disclosure. In FIG. 7, reference numeral 900 denotes a terminal of a program developer. In addition, in FIG. 7, PGM #1 denotes version 1 of the program, PGM #2 denotes version 2 of the program, and PGM #3 denotes version 3 of the program, wherein version 3 of the program is assumed to be a most recent version of the program.

When the program developer develops a new program, the developed program is transmitted to the management server 100. Here, an identifier for a home appliance on which the program is to be executed may be transmitted to the management server 100. The transmitted program may be stored in the storage unit 130 (see FIG. 3) of the management server 100.

The management server 100 (more specifically, the controller 110 (see FIG. 3) of the management server) may generate delta data based on the stored programs. That is, the management server 100 may generate first delta data (Delta #1) through comparison between version 3 of the program (PGM #3) and version 1 of the program (PGM #1) and may generate second delta data (Delta #2) through comparison between version 3 of the program (PGM #3) and version 2 of the program (PGM #2).

Then, the management server 100 may transmit the first delta data (Delta #1) to a home appliance 801 so as to upgrade the home appliance 801 in which version 1 of the program (PGM #1) is currently stored, and may transmit the second delta data (Delta #2) to upgrade a home appliance 802 in which version 2 of the program (PGM #2) is currently stored.

Figure 8:
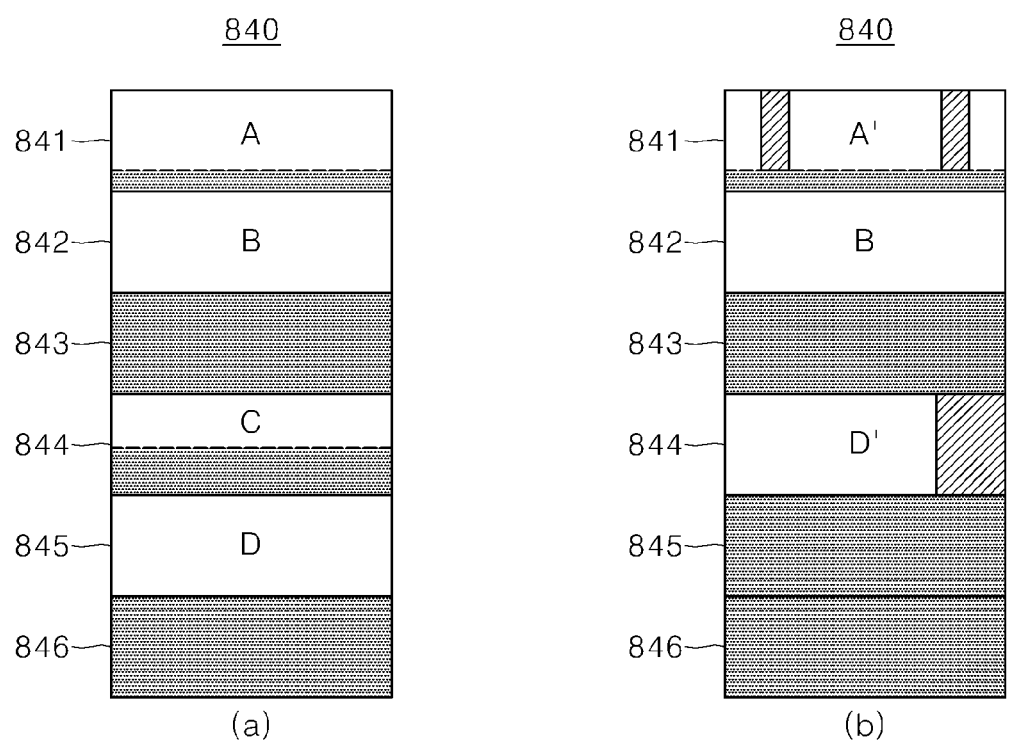
FIG. 8 is a schematic diagram illustrating an example of existing program data (a) and new program data (b) in the method for upgrading home appliances according to one embodiment of the present disclosure.

FIG. 8 is a schematic diagram illustrating examples of existing program data (FIG. 8, section (a)) and new program data (FIG. 8, section (b)) in the method for upgrading home appliances according to one embodiment of the present disclosure. In FIG. 8, each of the hatched regions indicates a change in the existing program data.

Referring to FIG. 8, section (a), the existing program data may include block A stored in section 841, block B stored in section 842, block C stored in section 844, and block D stored in section 845. Referring to FIG. 8, section (b), the new program data may include block A' stored in section 841, block B stored in section 842, and block D' stored in section 844. The management server 100 (more specifically, the controller 110 (see FIG. 4)) of the management server 100) may generate delta data through comparison between the existing program data (FIG. 8, section (a)) and the new program data (FIG. 8, section (b)).

Specifically, the management server 100 retrieves data most similar to block A' of the new program data (that is, data in the first section 841 of FIG. 8, section (b)) from the existing program data (FIG. 8, section (a)). Upon retrieval, the management server 100 may sequentially scan areas of the storage unit in which the existing program data is stored. Here, the areas may be scanned while sequentially increasing an address value, rather than being scanned section by section. The management server 100 may identify the data (block A) in the first section 841 (see FIG. 8, section (a)) as the most similar data, and then may determine data corresponding to a difference of block A' from block A (that is, data corresponding to the hatched regions in the first section 841 (see FIG. 8, section (b)) as a first component of delta data.

Then, the management server 100 retrieves data most similar to block B of the new program data (that is, data in the second section 842 of FIG. 8, section (b)) from the existing program data (FIG. 8, section (a)). The management server 100 may identify data (block B) in the second section 842 of FIG. 8, section (a) as data identical to block B of the new program data.

Then, the management server 100 retrieves data most similar to block D' of the new program data (that is, data in the fourth section 844 of FIG. 8, section (b)) from the existing program data (FIG. 8, section (a)). The management server 100 may identify data (block D) in the fifth section 845 of FIG. 8, section (a) as the most similar data, and then may determine data corresponding to a difference of block D' from block D (that is, data corresponding to the hatched region in the fourth section 844 of FIG. 8, section (b)) as a second component of the delta data.

Through this procedure, the management server 100 may ascertain that the existing program data can be made identical to the new program data (see FIG. 8, section (b)) by replacing a portion of the data in the first section 841 among the existing program data (FIG. 8, section a) with the first component of the delta data, replacing a portion of the data in the fifth section 845 among the existing program data with the second component of the delta data, and moving the data in the fifth section 845 to the fourth section.

Although FIG. 8 shows that data similar to data in one section of a storage unit storing the new program data is stored in one section of a storage unit for the existing program data, there may also be a case in which data similar to data in one section of a storage unit for the new program data is split into two sections of a storage unit for the existing program. In this case, delta data may be generated in the same manner as described above.

Figure 9:
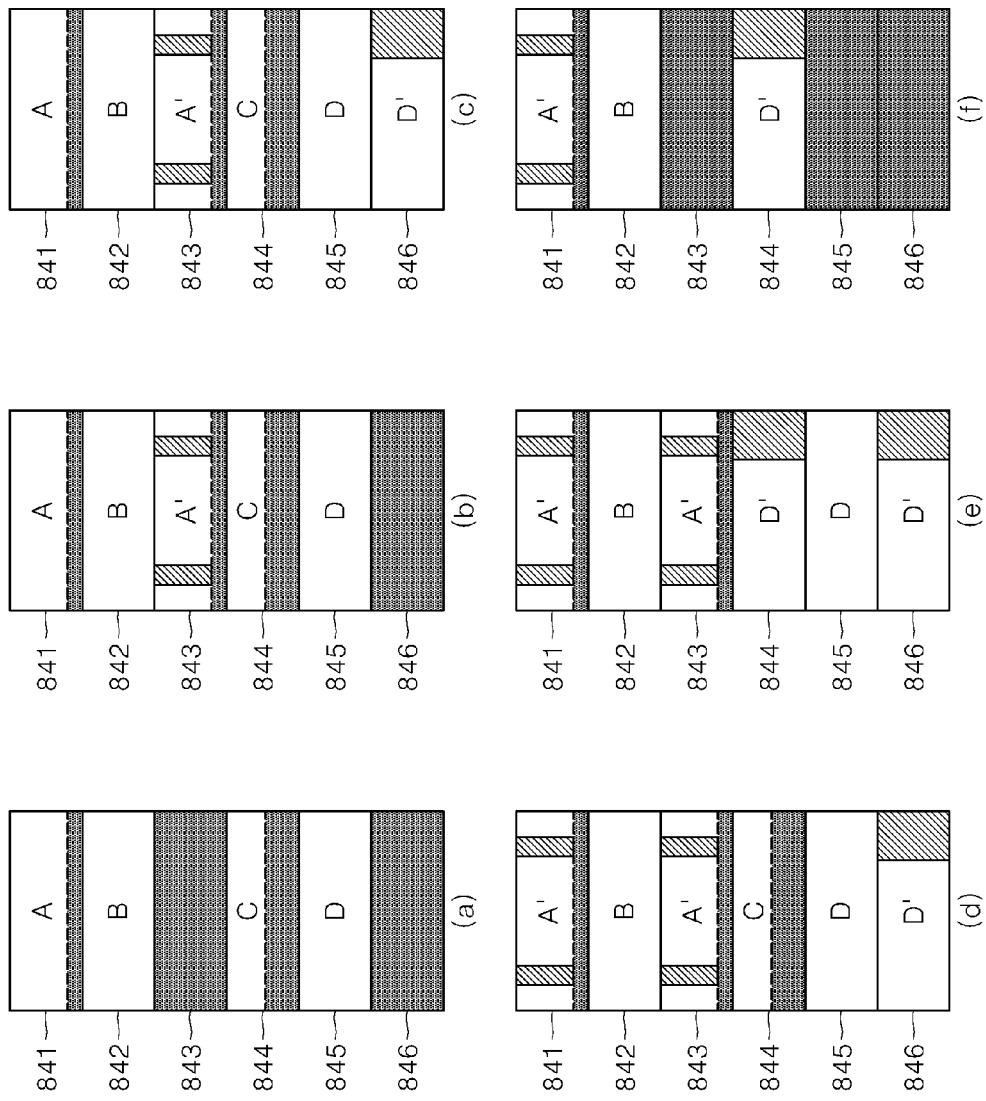
FIG. 9 to FIG. 11 are each a diagram illustrating a process of updating program data in the method for upgrading home appliances according to one embodiment of the present disclosure.

FIG. 9 is a diagram illustrating a process of updating program data in the method for upgrading home appliances according to one embodiment of the present disclosure. The process of FIG. 9 may be performed by the controller 820 (more specifically, the processing unit 821) of the home appliance, and delta data and a set of instructions causing the controller 820 to perform related operations may be transmitted from the management server 100 to the home appliance.

FIG. 9, section (a) shows program data before update. Referring to FIG. 9, section (b), data A in section 841 may be changed into data A', which, in turn, may be written to section 843. A detailed procedure thereof is the same as described in FIG. 8. That is, after data A in section 841 is read and written to a specific area of a volatile memory (for example, RAM), the data in the specific area of the volatile memory is changed into data A' by replacing a portion thereof with delta data received from the management server 100 and then data A' in the specific area of the volatile memory is written to section 843 of a non-volatile memory (for example, a flash memory).

Then, referring to FIG. 9, section (c), data D in section 845 may be changed into data D', which, in turn, may be written to section 846. A detailed procedure thereof is the same as described in FIG. 8. Then, referring to FIG. 9, section (d), data A' in section 843 may be written to section 841. More specifically, after data in the section 841 is deleted, data A' in section 843 is read and written to a specific area of the volatile memory and then data A' written to the specific area of the volatile memory is written to section 841.

Then, referring to FIG. 9, section (e), data D' in section 846 may be written to section 844. A detailed procedure thereof is similar to that described in FIG. 9, section (d). Then, referring to FIG. 9, section (f), unnecessary sections may be deleted. That is, data in sections 843, 845, 846 may be deleted. In this way, even when update of the program data is interrupted due to power failure or the like, the home appliance can autonomously restore the update process.

Figure 10:
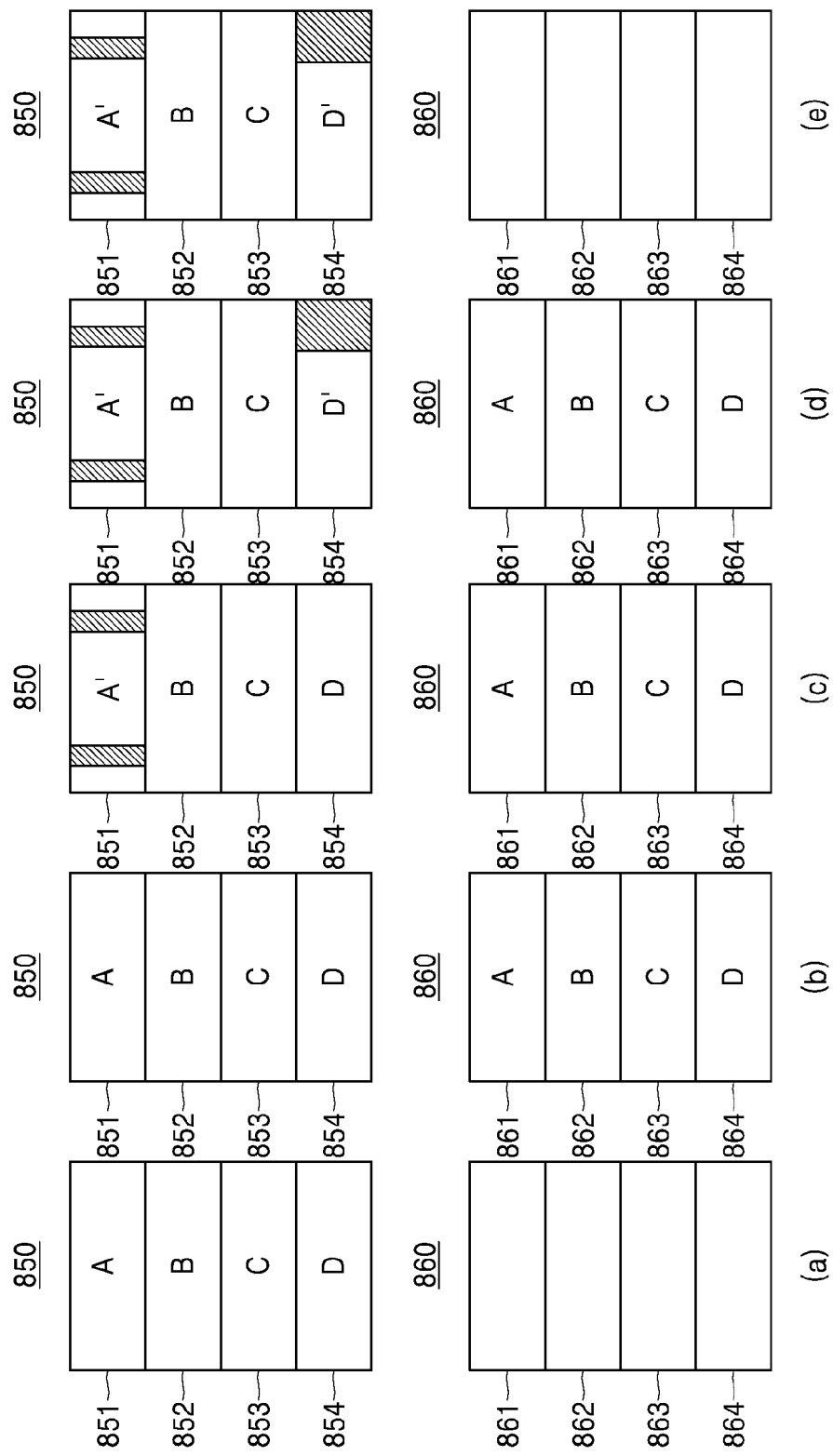

FIG. 10 is a diagram illustrating a process of updating program data in the method for upgrading home appliances according to one embodiment of the present disclosure. The process of FIG. 10 may be performed by the controller 820 (more specifically, the processing unit 821) of the home appliance, and delta data and a set of instructions causing the controller 820 to perform related operations may be transmitted from the management server 100 to the home appliance.

In the embodiment shown in FIG. 10, a nonvolatile memory (for example, a flash memory) has sufficient storage capacity. For example, the first storage unit 822 shown in FIG. 5 is designed to have a storage capacity twice that of a typical storage unit, or the home appliance includes the third storage unit 830 (see FIG. 5). That is, reference numeral 850 in FIG. 10 may be the first storage unit 822 illustrated in FIG. 5 and reference numeral 860 in FIG. 10 may be the third storage unit 830 illustrated in FIG. 5.

FIG. 10, section (a) shows program data before update. Referring to FIG. 10, section (b), data A, B, C, and D in the storage unit 850 may be copied to the storage unit 860. Specifically, data in respective sections 851, 852, 853, 854 of the storage unit 850 may be sequentially read and written to specific areas of a volatile memory and then the data in the specific areas of the volatile memory may be written to respective sections 861, 862, 863, 864 of the storage unit 860.

Then, referring to FIG. 10, section (c), data A in the storage unit 850 (section 851) may be changed into data A'. A detailed procedure thereof is the same as described in FIG. 8. That is, after data A in section 851 is read and written to a specific area of the volatile memory (for example, RAM), the data in the specific area of the volatile memory is changed into data A' by replacing a portion thereof with delta data received from the management server 100 and then data A' in the specific area of the volatile memory is written to section 851 of the non-volatile memory (for example, a flash memory).

Then, referring to FIG. 10, section (d), data D in section 854 may be changed into data D'. A detailed procedure thereof may be similar to that described in FIG. 10, section (c). Then, referring to FIG. 10, section (e), data written to the storage unit 860 may be deleted.

According to the embodiment shown in FIG. 10, a backup of an existing program can be made before performing update of the program. Accordingly, even when update of the program is interrupted due to power failure or the like, it is possible to restore the program without any errors.

Figure 11:
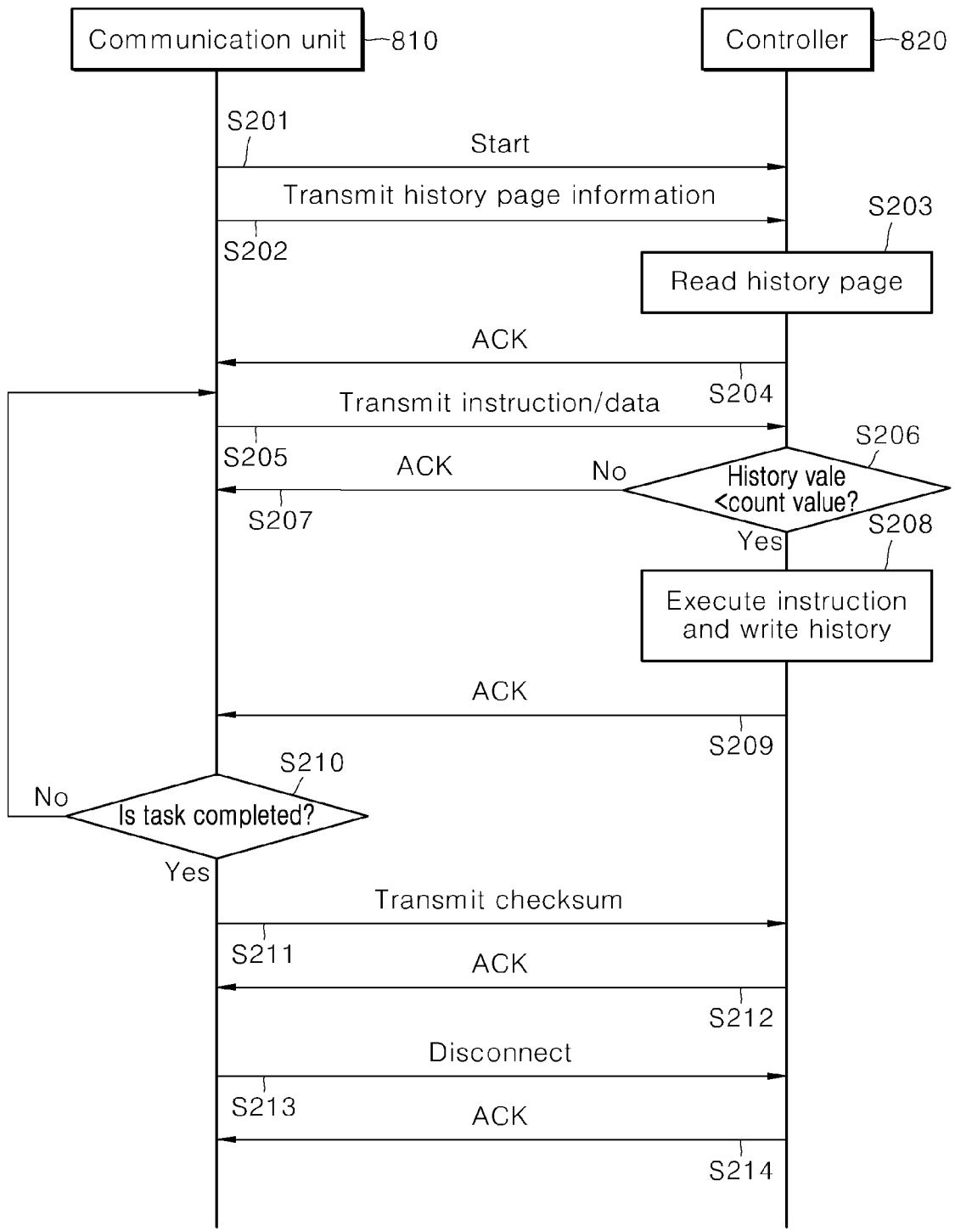

FIG. 11 is a flow diagram illustrating a process of updating program data in the method for upgrading home appliances according to one embodiment of the present disclosure. The process of FIG. 11 may be performed in step S110 of FIG. 5.

First, the communication unit 810 may notify the controller 820 that a program data update process is started (step S201). Then, the communication unit 810 may transmit information about a history page to the controller 820 (step S202). The information about the history page may be a specific address of a nonvolatile memory in a home appliance. Information about the number of instructions executed by the controller 820 during update of program data may be recorded at the specific address.

Then, the controller 820 may read the history page (step S203). As described above, the information about the number of previously executed instructions may be recorded on the history page. Then, the controller 820 may transmit an acknowledgment signal (ack) to the communication unit 810 (step S204).

In response to the acknowledgment signal (ack), the communication unit 810 may transmit instructions and/or delta data to the controller 820 (step S205). In step S205, the communication unit 810 may sequentially transmit instructions and/or delta data stored in the storage unit 811 in response to the acknowledgment signal (ack). The instructions transmitted from the communication unit 810 may contain a serial number thereof.

The controller 820 may determine whether a count value indicating the number of instructions received since the start of program update is greater than a value recorded on the history page (step S206). The number of received instructions may correspond to a serial number contained in an instruction transmitted from the communication unit 810. When the instruction transmitted from the communication unit 810 does not contain a serial number thereof, the controller 820 may count each time the controller 820 receives an instruction after the start of program update.

When a determination is made in step S206 that the count value is less than or equal to the value recorded on the history page, the controller 820 may transmit an acknowledgment signal (ack) to the communication unit 810 without executing a corresponding instruction (step S207).

When a determination is made in step S206 that the count value is greater than the value recorded on the history page, the controller 820 may execute a corresponding instruction (step S208). Here, the controller 820 may record the count value on the history page (step S208). Whether to perform an operation of recording the count value on the history page may depend on the type of instruction executed. For example, the count value may be recorded on the history page only when an operation of changing data in a non-volatile memory (for example, a flash memory) is performed. In some embodiments, the count value may be recorded on the history page only when an operation of deleting data in a non-volatile memory (for example, a flash memory) is performed. Then, the controller 820 may transmit an acknowledgment signal (ack) to the communication unit 810 (step S209).

In this way, even when an update process is interrupted due to power failure or other error, update of program data can be successfully completed. That is, instructions executed before interruption of the update process are recorded such that, upon restart of the update process, there is no need to repeat operations performed before interruption of the update process. Here, the count value is recorded on the history page only when an instruction to change data in the non-volatile memory is executed, such that operations on the volatile memory can be performed again. If an operation of writing data to the non-volatile memory is interrupted, there is a possibility that the data will not be successfully written. Accordingly, reliability of the operation can be further improved by recording the count value on the history page only when data in the non-volatile memory is deleted.

Then, the communication unit 810 may determine whether update of the program data is completed (step S210). The communication unit 810 may determine that update of the program data is completed when the set of instructions stored in the storage unit 811 is completely transmitted to the controller 820.

Then, the communication unit 810 may transmit a checksum to the controller 820 (step S211), and the controller 820 may reply to the communication unit 810 with an acknowledgment signal (ack) when the controller 820 ascertains that there is no error (step S212). That is, the controller 820 may ascertain whether there is an error in data transmission or the like. However, it should be understood that the present disclosure is not limited thereto and the controller 820 may ascertain whether there is an error in data transmission in other ways than the checksum.

Then, the communication unit 810 may notify the controller 820 of disconnection of the communication unit 810 from the controller 820 (step S213). Then, the controller 820 may reply to the communication unit 810 with an acknowledgment signal (ack) (step S214), and the communication unit 810 may finally interrupt the connection to the controller 820.

Embodiments of the present disclosure provide an apparatus and method for upgrading the function of an electronic device more conveniently. Embodiments of the present disclosure provide an apparatus and method capable of reducing the time required to upgrade an electronic device. Embodiments of the present disclosure provide an apparatus and method capable of reducing the amount of data transmitted to upgrade an electronic device. Embodiments of the present disclosure provide an apparatus and method capable of ensuring successful completion of an operation of upgrading an electronic device without problems such as error occurrence even when operation of the electronic device is interrupted due to power failure or the like during upgrade of the electronic device.

The above and other aspects and advantages of the present disclosure will become apparent from the detailed description of the following embodiments in conjunction with the accompanying drawings. In addition, it will be readily understood that the objects and advantages of the present disclosure can be realized by features set forth in the appended claims or combinations thereof.

In an electronic device, a server, and a method according to embodiments of the present disclosure, only delta data, which is a changed portion of program data for controlling operations of the electronic device, may be transmitted from the server to the electronic device.

In the electronic device, the server, and the method according to embodiments of the present disclosure, only delta data, which is a changed portion of program data for controlling operations of the electronic device, may be transmitted from a communication unit of the electronic device to a controller of the electronic device.

In the electronic device, the server, and the method according to embodiments of the present disclosure, data most similar to data in each sector of new program data may be retrieved from existing program data, followed by generating delta data through comparison between the retrieved data and the data in each sector.

In the electronic device, the server, and the method according to embodiments of the present disclosure, among program data stored in a first storage unit of the electronic device, data in a first area that includes data corresponding to delta data may be read and then, among the read data, the data corresponding to the delta data may be replaced with the delta data. Here, the first storage unit may be a non-volatile memory.

In the electronic device, the server, and the method according to embodiments of the present disclosure, data stored in the first area of the first storage unit of the electronic device may be read, followed by replacing a portion of the read data with delta data, and then the data partially replaced with the delta data may be stored in a second area of the first storage unit.

In the electronic device, the server, and the method according to embodiments of the present disclosure, delta data and an instruction to be executed by the controller of the electronic device may be transmitted from the server to the communication unit of the electronic device.

In the electronic device, the server, and the method according to embodiments of the present disclosure, a history corresponding to the number of instructions executed by the controller of the electronic device may be stored in a storage unit of the electronic device. Here, the history may be stored when an instruction to delete data in a certain area of the storage unit is executed.

In accordance with one aspect of the present disclosure, an electronic device includes: a storage unit storing program data; a communication unit receiving and storing a file for updating the program data from a management server and transmitting update data for updating the program data based on the stored file; and a controller updating the program data in response to the update data, wherein the update data transmitted from the communication unit includes delta data and an instruction, the delta data including only a changed portion of the program data.

The controller may include: a storage unit storing the program data; and a processing unit reading first data in a first area of the storage unit, generating second data by replacing a portion of the first data in the first area with the delta data, and storing the second data in a second area different from the first area.

The controller may include: a first storage unit storing the program data, the first storage unit including a non-volatile memory; a second storage unit including a volatile memory; and a processing unit updating the program data in response to the update data, wherein the processing unit may read data in a first area of the first storage unit, may write the read data to a second area of the second storage unit, may replace a portion of the data in the second area with the delta data, and may write the data in the second area to a third area different from the first area of the first storage unit. The first storage unit may include multiple sections, and the processing unit may write the data in the third area to one of the multiple sections and may delete the data in the third area.

The controller may include: a first storage unit storing the program data, the first storage unit including a non-volatile memory; a second storage unit including a volatile memory; and a processing unit updating the program data in response to the update data, the electronic device may further include: a third storage unit comprising a non-volatile memory, and the processing unit may write the program data stored in the first storage unit to the third storage unit and may replace a portion of data in a first area of the first storage unit with the delta data.

The processing unit may delete the data in the third storage unit after completion of update of the program data. When a count value indicating the number of instructions received since the start of update of the program data is less than or equal to a history value recorded on a history page, the controller does not execute the instruction and, when the count value is greater than the history value, the controller executes the instruction. When the instruction is an instruction to write/delete data to/from a non-volatile memory, the controller may record the count value on the history page.

In accordance with another aspect of the present disclosure, a management server includes: a storage unit storing a most recent version of program data and a previous version of the program data; a controller generating delta data through comparison between the most recent version of the program data and the previous version of the program data; and a communication unit transmitting the delta data to an electronic device, wherein the delta data includes only data corresponding to a difference of the most recent version of the program data from the previous version of the program data.

The controller may retrieve data most similar to data in a first section among the most recent version of the program data through comparison between the data in the first section and the entirety of the previous version of the program data and may determine data corresponding to a difference of the data in the first section from the most similar data as the delta data. The communication unit may transmit a file including the delta data and at least one instruction to the electronic device.

The previous version of the program data may include a first version of the program data and a second version of the program data, the delta data may include first delta data and second delta data, and the controller may generate the first delta data through comparison between the most recent version of the program data and the first version of the program data and may generate the second delta data through comparison between the most recent version of the program data and the second version of the program data.

The communication unit may transmit the first delta data to a first electronic device storing the first version of the program data and may transmit the second delta data to a second electronic device storing the second version of the program data.

In accordance with a further aspect of the present disclosure, there is provided a method for upgrading an electronic device including a communication unit storing a file received from a management server and a controller storing program data, the method including: transmitting, by the communication unit, delta data and an instruction to the controller, the delta data including only a changed portion of the program; and replacing, by the controller, a portion of the program data with the delta data.

Replacing the portion of the program data with the delta data may include: reading data in a first area of a non-volatile memory storing the program data and writing the read data to a second area of a volatile memory; replacing a portion of the data in the second area with the delta data; and writing the data in the second area to a third area different from the first area of the non-volatile memory.

Replacing the portion of the program data with the delta data may further include: writing the data in the third area to one of multiple sections of the non-volatile memory; and deleting the data in the third area.

Replacing the portion of the program data with the delta data may include: storing the program data stored in a first non-volatile memory in a second non-volatile memory; replacing a portion of data in a first area of the first non-volatile memory with the delta data; and deleting the data in the second volatile memory.

Replacing the portion of the program data with the delta data may include: recording a count value indicating the number of instructions received since the start of update of the program data on a history page when the instruction is an instruction to write/delete data to/from a non-volatile memory; comparing the count value with a history value recorded on the history page; and executing the instruction when the count value is greater than the history value and not executing the instruction when the count value is less than or equal to the history value.

The method may further include: retrieving, by the management server, data most similar to data in a first section among a most recent version of the program data through comparison between the data in the first section and the entirety of a previous version of the program data; and determining, by the management server, data corresponding to a difference of the data in the first section from the most similar data as the delta data.

The electronic device, the server, and the method according to embodiments of the present disclosure can ensure easy upgrade of electronic devices. In addition, the electronic device, the server, and the method according to embodiments of the present disclosure can ensure reduction in amount of time required to upgrade electronic devices. In addition, the electronic device, the server, and the method according to embodiments of the present disclosure can ensure reduction in amount of data transmitted upon upgrade of electronic devices.

In addition, the electronic device, the server, and the method according to embodiments of the present disclosure can ensure successful completion of an operation of upgrading an electronic device without problems such as error occurrence even when operation of the electronic device is interrupted due to power failure or the like during upgrade of the electronic device.

Although some exemplary embodiments have been described herein, it should be understood by those skilled in the art that these embodiments are given by way of example only, and that various modifications, variations, and alterations can be made without departing from the spirit and scope of the present disclosure. In addition, although advantageous effects provided by a certain configuration are not clearly described in description of the exemplary embodiments, it should be noted that expectable effects of the corresponding configuration should be acknowledged.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device comprising:
   a communication interface configured to receive a file including update data for updating program data of the electronic device; and
   a controller configured to update the program data in response to the update data,
   wherein the update data includes delta data and an instruction, the delta data consisting of a changed portion of the program data, and
   wherein, when a count value indicating a number of instructions received since the start of updating the program data is less than or equal to a history value recorded on a history page, the controller does not execute the instruction and, when the count value is greater than the history value, the controller executes the instruction.

2. The electronic device according to claim 1, wherein the controller includes:
   a storage device configured to the program data; and
   a processor configured to read first data in a first area of the storage device, generate second data by replacing a portion of the first data in the first area with the delta data, and store the second data in a second area of the store device, the second area being different from the first area.

3. The electronic device according to claim 1, wherein the controller includes:
   a first storage device including a non-volatile memory configured to store the program data;
   a second storage device including a volatile memory; and
   a processor configured to update the program data in response to the update data, and
   wherein processor is configured to sequentially read data in a first area of the first storage device, write the read data to a second area of the second storage device, replace a portion of the data written to the second area with the delta data, and write the data in the second area to a third area that is different from the first area of the first storage device.

4. The electronic device according to claim 3, wherein the third area is included in the first storage device, and the processor is configured to delete the data in the third area.

5. The electronic device according to claim 1, wherein the controller includes:
   a first storage device configured to store the program data, the first storage device including a non-volatile memory;
   a second storage device including a volatile memory; and a processor configured to update the program data in response to the update data, and wherein the electronic device further comprises a third storage device including a non-volatile memory, and when controller updates the program data, the processor writes the program data stored in the first storage device to the third storage device and to replace a portion of data in a first area of the first storage device with the delta data.

6. The electronic device according to claim 5,
wherein the processor deletes the data in the third storage device after completion of updating the program data.

7. The electronic device according to claim 1,
wherein, when the instruction includes altering data of a non-volatile memory, the controller in configured to record the count value on the history page.

8. A method for upgrading program data of an electronic device, the method comprising:
receiving, by the electronic device, delta data and an instruction, the delta data consisting of a changed portion of the program data; and
replacing, by the electronic device, a portion of the program data with the delta data,
wherein replacing the portion of the program data with the delta data includes:
determining a count value indicating the number of instructions received since the start of an update of the program data on a history page when the instruction is an instruction to write/delete data to/from a non-volatile memory:
comparing the count value with a history value recorded on the history page; and
executing the instruction when the count value is greater than the history value and not executing the instruction when the count value is less than or equal to the history value.

9. The method according to claim 8,
wherein the electronic device includes a non-volatile memory and a volatile memory, and
wherein replacing the portion of the program data with the delta data includes:
reading data in a first area of the non-volatile memory storing the program data, and writing the read data to a second area of the volatile memory;
replacing a portion of the data written in the second area with the delta data; and
writing the data in the second area to a third area that is different from the first area of the non-volatile memory.

10. The method according to claim 9,
wherein replacing the portion of the program data with the delta data further includes:
writing the data in the third area to the non-volatile memory; and
deleting the data in the third area after writing the data in the third area to the non-volatile memory.

11. The method according to claim 8,
wherein the electronic device includes a non-volatile memory, and a volatile memory, and
wherein replacing the portion of the program data with the delta data includes:
storing a copy of the program data, stored in the non-volatile memory, in the volatile memory;
replacing a portion of the program data in a first area of the non-volatile memory with the delta data after storing the copy of the program data in the volatile memory; and
deleting the data in the volatile memory after replacing the portion of the program data in the first area of the non-volatile memory with the delta data.

12. The method according to claim 8, further comprising:
recording the count value on the history page when the instruction includes altering data of the non-volatile memory.

13. The method according to claim 8, further comprising:
retrieving data most similar to data in a first section of a most recent version of the program data through a comparison between the data in the first section and an entirety of a previous version of the program data; and
determining data different from the data most similar the data in the first section as the delta data.

* * * * *